United States Patent [19]

Bentley

[11] Patent Number: 4,548,960

[45] Date of Patent: Oct. 22, 1985

[54] PIPE JOINTING COMPOUNDS

[75] Inventor: Herbert W. Bentley, Sylvania, Australia

[73] Assignee: UNASCO Pty. Limited, Girraween, Australia

[21] Appl. No.: 554,778

[22] Filed: Nov. 23, 1983

Related U.S. Application Data

[63] Continuation-in-part of Ser. No. 254,241, Apr. 15, 1981, abandoned, which is a continuation-in-part of Ser. No. 85,135, Oct. 15, 1979, abandoned.

[30] Foreign Application Priority Data

Oct. 17, 1978 [AU] Australia ............................ PD6405

[51] Int. Cl.$^4$ .......................... C08K 3/04; C08K 3/10
[52] U.S. Cl. ..................... 523/176; 252/12; 285/355; 524/546; 524/109; 524/313; 524/451; 524/445; 524/520; 526/255
[58] Field of Search ............. 523/176; 524/546, 109, 524/313, 451, 445, 520; 526/255; 85/1 C, 1 JP; 285/355; 252/12

[56] References Cited

U.S. PATENT DOCUMENTS

| | | | |
|---|---|---|---|
| 2,578,523 | 12/1951 | Llewellyn | 264/115 |
| 2,586,357 | 2/1952 | Llewellyn | 264/115 |
| 3,002,770 | 10/1961 | Chesnut et al. | 85/1 C |
| 3,037,893 | 6/1962 | White | 252/12 |
| 3,069,387 | 12/1962 | Allen et al. | 252/49.7 |
| 3,287,288 | 11/1966 | Reiling | 252/12 |
| 3,437,630 | 4/1969 | Winkle et al. | 523/176 |
| 3,869,393 | 3/1975 | Booker | 252/12 |
| 3,993,584 | 11/1976 | Owen et al. | 106/308 M |
| 4,157,328 | 6/1979 | Beyer et al. | 524/546 |
| 4,163,742 | 8/1979 | Mansure | 524/546 |
| 4,163,825 | 8/1979 | Wimmer | 428/368 |

FOREIGN PATENT DOCUMENTS

| | | | |
|---|---|---|---|
| 48-30106 | 9/1973 | Japan | 252/12 |
| 891537 | 3/1962 | United Kingdom | 106/308 M |
| 1119536 | 7/1968 | United Kingdom | 85/1 C |

OTHER PUBLICATIONS

SPE Journal, Apr. 1970, vol. 26, pp. 78-85.

Primary Examiner—Ronald W. Griffin
Attorney, Agent, or Firm—Ladas & Parry

[57] ABSTRACT

A composition suitable for pipe jointing compounds is provided, which composition contains synthetic fibres, such as PTFE, FEP, polyethylene or polypropylene in admixture with a suitable carrier.

11 Claims, 1 Drawing Figure

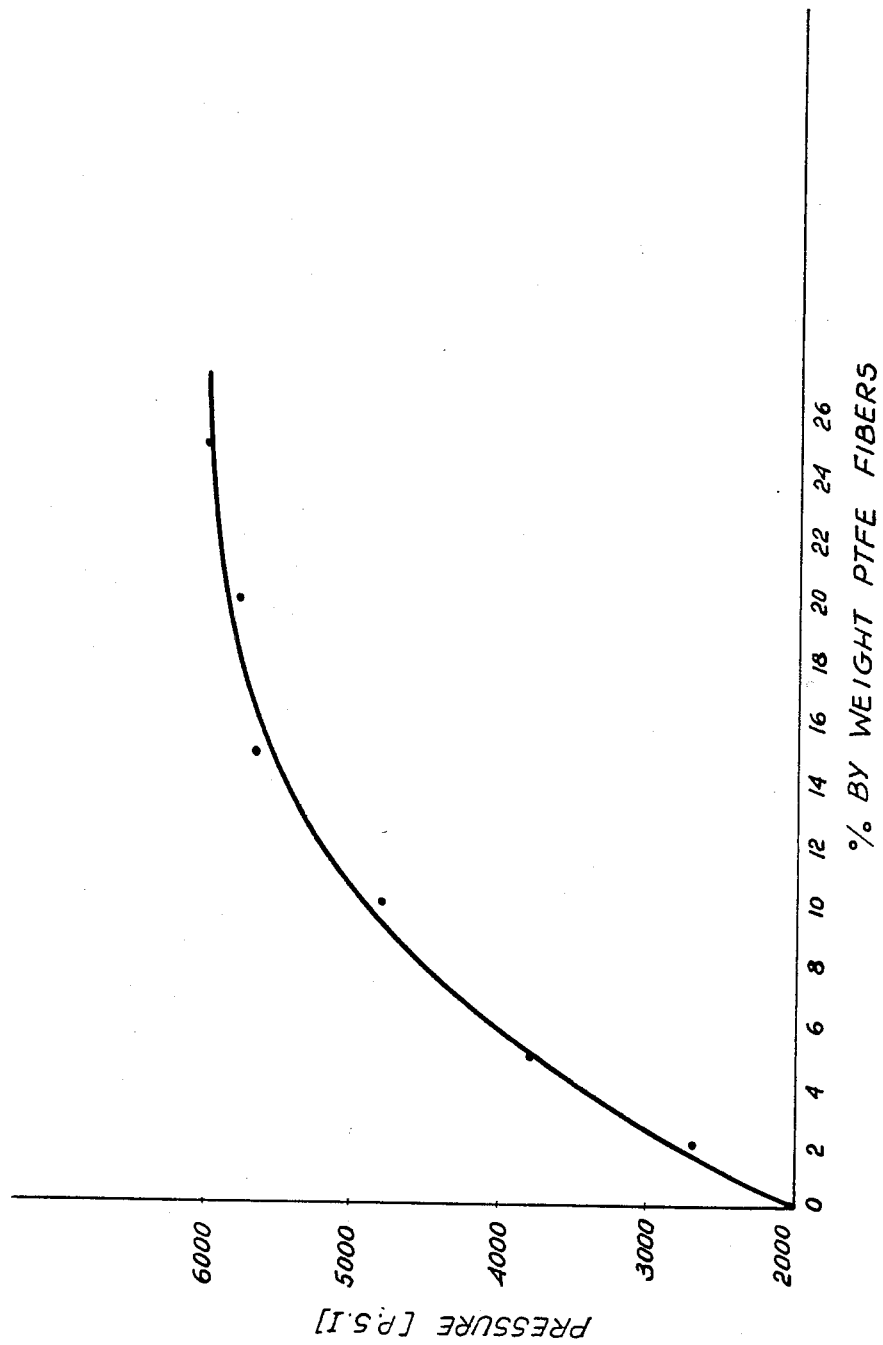

PIPE JOINTING COMPOUNDS

This application is a continuation in part of application Ser. No. 254,241 filed the Apr. 15, 1981, now abandoned, which is a continuation in part of Ser. No. 085,135 filed the Oct. 15, 1979, now abandoned.

The invention relates to paste compositions useful as threads sealants or pipe jointing compounds.

Commonly, TEFLON (Registered Trade Mark) or polytetrafluoroethylene (PTFE) tape is applied to threaded connections to aid sealing. This method of sealing joints generally replaced the earlier method of using a length of hemp thread which thread expanded in the pipe joint, upon water uptake, to promote sealing. However, difficulties encountered with the application of the tape, plugging lines and "balling up" of the tape are disadvantages which were sought to be overcome by the use of a pipe jointing compound in paste form. Pipe jointing compounds or sealants containing powdered PTFE resins or other such powders suitably dispersed in a liquid crrier are known. Generally, such sealants have been suitable for high quality fittings but are found to be unsuitable at fairly low pressure on lower grade water fittings with lower tolerances. It is the object of the present invention to substantially ameliorate such problems by providing an improved paste composition suitable for use in a pipe jointing composition which is reinforced with synthetic fibres in admixture with a suitable carrier.

According to the present invention there is provided a composition suitable as pipe jointing compounds in paste form which composition contains synthetic fibres selected from the group consisting of polytetrafluoroethylene (PTFE), fluorinated ethylene/propylene polymer (FEP), other fluorinated and chlorinated homopolymers and copolymers of olefins, polyolefin fibres such as polyethylene and polypropylene and mixtures of such fibres in admixture with a suitable carrier.

As used herein the term polyolefin is intended to mean not only polyethylene and polypropylene as well as PTFE and FEP, but also other fluorinated and chlorinated homopolymers and copolymers of olefins such as virylidene fluoride, chlorotrifluoroethylene, and hexafluoropropylene polymers.

PTFE is known for its lubricant properties and has been used in powdered form as a lubricant for threads etc. Also, because of its antifriction properties and chemical inertness, it has been used as a filler in stuffing box packings.

U.S. Pat. No. 3,069,387 discloses thixotropic thread lubricants containing a powdered polytetrafluoroethylene. The powdered PTFE is employed because of its antifriction properties thereby permitting two surfaces to ride with respect to one another. The PTFE particles are finely powdered, viz. 1 to 20 microns and are suspended in castor oil with the additional ingredient of dimethyldioctadecyl bentonite. The patent teaches the lubricating properties of the PTFE particles whereby a reduction in the galling between threaded members results.

U.S. Pat. No. 2,578,523 teaches the use of matted shreds, flakes or strands of PTFE in a pulpy mass for use in the packing of stuffing boxes of pumps, valves and other equipment where a tight seal is required. Unsintered PTFE particles are passed through rolling mills repeatedly until the solid PTFE changes its pyhsical appearance and assumes the form of matted shreds, flakes or strands. These threads are then reduced to a pulpy mass by a mechanical shredding process, which mass is then used as a packing material preferably in combination with various binders and fillers. The resulting mass is extremely viscous and is rammed into a stuffing box or the like. The matted shreds or strands are necessarily of a far greater size than the fibres of the present invention. The pulpy mass resulting from the invention of this U.S. patent would in no way be suitable as a pipe sealant as the tightening of the threads would cause the mass having the larger particles, in the form of shreds or flakes of PTFE, to be pushed out of the joint and hence a seal would not be obtained.

U.S. Pat. No. 2,586,357 is directed to compositions comprising coagulated PTFE in admixture with hydrocarbon lubricants. The compositions provide a means for moulding PTFE at low temperatures for extrusion into various forms. This U.S. patent does not teach the use of a fibrillated PTFE in the form of a paste which exhibits extremely good thread sealant properties.

U.S. Pat. No. 4,163,825 teaches the use of threads or fibres of PTFE embedded in an envelope consisting of fine particles of PTFE, a heat conducting pigment and a binder. The enveloped threads are inter laced in order to provide a sealing packing. The prior art gives no indication that PTFE or other similar polymers in fibre form can be used in paste compositions in the form of a brushable composition nor does the prior art suggest the unexpected sealing properties that the fibre-reinforced pastes of the present invention exhibit in threaded connections.

It has been found that the paste of the present invention can provide up to three times the pressure that sealants containing only powdered PTFE withstand. It is thought that the synthetic fibres lodge in the threads of the joint and promote the seal between the two threaded members. In comparison, larger particles of shreds, flakes or the like are pushed out of the thread during engagement of the two threaded members. Also, it has been particularly noted with polyethylene that the fibres tend to expand in the joint whereby sealing is promoted. In a preferred embodiment of the present invention PTFE of FEP fibres are used in combination with polyethylene fibres in a paste form.

Generally the paste of the present invention comprises essentially of from 2 to 25% by weight of synthetic fibres selected from the group consisting of polytetrafluoroethylene (PTFE), fluorinated ethylene/propylene polymer (FEP), polyolefins and mixtures of such fibres, together with from 25% to 60% of a liquid carrier and 20 to 50% of a pulverulent filler.

Preferred liquid carriers for the paste of the present invention are vegetable or mineral oils such as epoxidised soya bean oil, castor oils, blown castor oil, alkyd varnish, silicon oil, and long oil phenolics. The compositions also comprise a filler such as talc, clay and/or PTFE powder.

It is preferred that the synthetic fibres selected form the group consisting of PTFE, fluorinated ehtylene/propylene, and another fluorinated and chlorinated homopolymers and copolymers of olefins such as vinylidene fluoride, chlorotrifluoroethylene and hexafluoropropylene polymers, as well as polyolefins such as polyethylene and polypropylene comprise from 2 to 25% by weight of the paste.

In a more preferred form of the invention the compositions comprise;

from about 20 to 45% by weight of a filler, such as talc or clay;

from about 5 to 15% by weight of the synthetic fibres, preferably TEFLON, polyethylene, polypropylene, FEP, and fluorinated and chlorinated homopolymers and copolymers of olefins such as vinylidene fluoride, chlorotrifluoroethylene and hexafluoropropylene;

from about 25 to 50% by weight more preferably 35 to 50% by weight of a liquid diluent, such as mineral or vegetable oils, particularly soya bean oil, castor oil, blown castor oil, alkyd varnish, silicon oil, long oil phenolic or other synthetic base oils; and from about 0 to 30% by weight of PTFE powder.

If desired these compositions may also contain pigment materials such as titanium dioxide in an amount of from 0% to about 7%, preferably about 2.5%.

The following Examples serve to further illustrate but do not limit the present invention.

EXMPLE 1

The following ingredients were admixed together and yielded a composition exhibiting very good joint sealant properties. It was found to give a satisfactory seal on undamaged or damaged threads.

6 lbs of talc
4 lbs of PTFE powder
½ lb of titanium dioxide
¾ gallon of castor oil
2 lbs of TEFLON fibre The paste of the above Example was brushed onto a pipe thread and the sealing property was compared to similar compositions containing only PTFE powder. The test conducted by the Sydney Metropolitan Water, Sewage and Drainage Board comprises cutting across parallel and tapered threads, ranging in size, which have been damaged slightly. 11.5 foot pounds are applied to the fittings to tighten them, water pressure is then increased to determine the point at which the seal fails. A thread painted with the composition of this Example failed at 50 psi, whereas compositions containing only PTFE powder failed at about 20 psi.

The composition of EXAMPLE 1 was shown to withstand some three times the pressure that the powdered PTFE paste composition withstood.

EXAMPLE 2

Talc: 45%
TiO2: 3%
Castor oil: 40%
TEFLON fibre: 12%

EXAMPLE 3

Talc: 35%
PTFE powder: 15%
TiO2: 2.5%
Blow castor oil: 27.5%
Polyethylene fibres: 10%

EXAMPLE 4

Clay: 47%
TiO2: 3%
Polyethylene fibres: 14%
Castor oil: 36%

EXAMPLE 5

A basic sealant composition was made up comprising:

Clay: 99 kg
PTFE Resin: 40 kg
White Pigment: 12 kg
Epoxidised Soybean Oil (such as that marketed under the trade name of Admix 710): 158 kg PTFE fibres were added to batches of this mixture using a cavetational mixer to provide fibre contents of 2%, 5%, 10%, 15%, 20% and 25% by weight.

The compositions were tested on a ⅜ inch galvanized BSP fitting on a hydraulic rig. Pressure at which leaking occurred was measured (to nearest 50 psi) and duplicate results were averaged to provide results as follows:

| % PTFE FIBRES | PRESSURE (PSI) |
| --- | --- |
| 0 | 2000 |
| 2 | 2700 |
| 5 | 3800 |
| 10 | 4800 |
| 15 | 5650 |
| 20 | 5750 |
| 25 | 6000 |

The results are provided in graph form in FIG. 1 and show that incorporation of fibres at levels as low as 2% by weight confer increased sealant properties on sealant compositions. The sealant properties level off at about 25% by weight fibre content although at this level, not only is fibre incorporation somewhat uneconomic but also the paste form becomes somewhat difficult to handle and apply to the thread. FIG. 1 graphs the above results.

The claims defining the invention are as follows:

1. A pipe jointing or thread sealant composition in paste form comprising from 2 to 25% by weight of synthetic fibres selected from the group consisting of polytetrafluoroethylene (PTFE), fluorinated ethylene/propylene polymer (FEP), polyolefins and mixtures of such fibres, together with from 25% to 60% of a liquid carrier and 20 to 50% of a pulverulent filler.

2. The composition of claim 1 wherein said fibres are selected from the group consisting of polytetrafluoroethylene, fluorinated ethylene/propylene and polyethylene.

3. The composition as claimed in claim 1 further comprising PTFE powder.

4. A pipe jointing composition in paste form comprising:
   (i) from 20 to 45% by weight of a filler;
   (ii) from 20 to 50% by weight of a liquid diluent;
   (iii) from 5 to 15% by weight of synthetic fibres selected from the group consisting of polytetrafluoroethylene, fluorinated ethylene/propylene polymer, polyolefins and mixtures of such fibres;
   (iv) from 0 to 30% by weight of PTFE powder.

5. The composition as claimed in claim 4 wherein the fibres are selected from the group consisting of PTFE, FEP, polyethylene or polypropylene fibres and mixtures of such fibres.

6. The composition as claimed in claim 5 wherein the synthetic fibres are a mixture of PTFE and polyethylene.

7. The composition as claimed in claim 4 wherein said liquid diluent is selected from the group consisting of epoxidised soya bean oil, castor oil, blown castor oil, silicon oil, alkyd varnish, long oil phenolic and other synthetic base oils.

8. A composition as claimed in claim 4 wherein said filler is talc.

9. A composition suitable for use as a pipe jointing compound in paste form comprising:
- (i) from 25 to 35% by weight of a filler selected from the group consisting of talc and clay;
- (ii) from 0 to 30% by weight of PTFE Powder;
- (iii) from 0 to 7% by weight of pigment material;
- (iv) from 30 to 50% by weight of a liquid diluent selected from the group consisting of castor oil, silicon oil, alkyd varnish, long oil phenolics, and other synthetic base oils; and
- (v) from 5 to 15% by weight of a synthetic fiber selected from the group consisting of PTFE fibers, FEP fibers, polyethylene fibers and polypropylene fibers.

10. The composition as claimed in claim 9 wherein the synthetic fibres comprise PTFE fibres and polyethylene fibres.

11. A composition in paste form suitable for use as a pipe jointing composition comprising:
- from 25 to 35% by weight of talc or clay;
- from 10 to 13% by weight of PTFE Powder;
- from 2 to 5% by weight of pigment material;
- from 40 to 50% by weight of liquid diluent selected from the group consisting of vegetable and mineral oils; and
- from 2 to 15% by weight of synthetic fibres selected from the group consisting of PTFE fibres, FEP fibres, polyethylene fibres, polypropylene fibres and mixtures thereof.

* * * * *